United States Patent
Yang et al.

(10) Patent No.: US 10,527,473 B2
(45) Date of Patent: Jan. 7, 2020

(54) MICROWAVE FLOWMETER HAVING A TRANSMITTING CIRCUIT WITH A PLURALITY OF RESONATOR ELEMENTS GENERATING CORRESPONDING MICROWAVES HAVING A RESONANT FREQUENCY

(71) Applicant: NATIONAL CHENG KUNG UNIVERSITY, Tainan (TW)

(72) Inventors: Ching-Lung Yang, Tainan (TW); Chia-Ming Hsu, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 139 days.

(21) Appl. No.: 15/826,207

(22) Filed: Nov. 29, 2017

(65) Prior Publication Data
US 2019/0154478 A1    May 23, 2019

(30) Foreign Application Priority Data
Nov. 21, 2017   (TW) .............................. 106140398 A

(51) Int. Cl.
*G01F 1/66*   (2006.01)
(52) U.S. Cl.
CPC ..................... *G01F 1/66* (2013.01)
(58) Field of Classification Search
None
See application file for complete search history.

(56) References Cited

U.S. PATENT DOCUMENTS

| 5,260,665 A * | 11/1993 | Goldberg ............... G01N 22/00 324/636 |
| 5,334,941 A * | 8/1994 | King ....................... G01N 22/00 324/637 |
| 2015/0168314 A1* | 6/2015 | El Matbouly ...... G01N 33/0036 324/633 |
| 2017/0074816 A1* | 3/2017 | Jean .......................... G01K 1/00 |

FOREIGN PATENT DOCUMENTS

| EP | 0511651 A2 | 11/1992 |
| TW | I603079 B | 10/2017 |

* cited by examiner

*Primary Examiner* — Harshad R Patel
(74) *Attorney, Agent, or Firm* — Rabin & Berdo, P.C.

(57) ABSTRACT

A microwave flowmeter and a flow rate measurement method are provided. The microwave flowmeter includes a transmitting circuit, a detecting circuit, and a computing unit. The transmitting circuit includes a substrate, a plurality of resonator elements, and a transmission line. Two ends of the transmission line receive high frequency electric feedings, so that the resonator elements separately generate corresponding microwaves and each of the microwaves has at least one resonant frequency. The detecting circuit detects offsets of the corresponding resonant frequencies that are caused when a fluid flows through the resonator elements, and records times at which the offsets happen. The computing unit is electrically connected to the detecting circuit, and computes a flow rate of the fluid according to the times at which the offsets happen of the resonant frequencies and locations that are of the resonator elements and that correspond to a flow path.

12 Claims, 7 Drawing Sheets

MICROWAVE FLOWMETER HAVING A TRANSMITTING CIRCUIT WITH A PLURALITY OF RESONATOR ELEMENTS GENERATING CORRESPONDING MICROWAVES HAVING A RESONANT FREQUENCY

CROSS-REFERENCE TO RELATED APPLICATION

This non-provisional application claims priority under 35 U.S.C. § 119(a) to Patent Application No. 106140398 filed in Taiwan, R.O.C. on Nov. 21, 2017, the entire contents of which are hereby incorporated by reference.

BACKGROUND

Technical Field

The present invention relates to a flow rate meter, and in particular, to a microwave flowmeter and a flow rate measurement method.

Related Art

Currently, a flow rate meter generally measures a fluid flow rate in a contact manner or an intrusive manner. For example, for a flow rate meter with a rotatable oar that is installed in a water pipe or a ditch, a water current drives the rotatable blade vane to rotate, and a flow rate of the water current can be measured by measuring a rotation speed of the rotatable blade vane. Installation of this contact-manner flow rate meter is relatively inconvenient, and the device easily wears down because the device is in contact with a fluid for a long time.

However, for some non-contact flow rate meters, such as a ultrasonic flow rate meter and a radar wave flow rate meter that use the Doppler principle, measurement is performed by using the Doppler principle and there is a limitation on a measurement direction, and therefore the measurement cannot be performed in a direction perpendicular to a flow direction of a fluid.

SUMMARY

In view of this, an embodiment of the present invention provides a microwave flowmeter, including a transmitting circuit, a detecting circuit, and a computing unit. The transmitting circuit includes a substrate, a plurality of resonator elements, and a transmission line. The substrate has a first surface and a second surface that are opposite to each other, where the first surface faces towards a flow path of the fluid. The resonator element is disposed on the first surface of the substrate, and lengths of resonance currents of the resonator elements are not equal. A transmission line is disposed on a second surface of the substrate, and disposed corresponding to locations of the resonator elements, where two ends of the transmission line receive electric feedings, so that the resonator elements separately generate corresponding electromagnetic fields and each of the microwave resonators has at least one resonant frequency. The detecting circuit detects offsets of the corresponding resonant frequencies that are caused when a fluid flows through the resonator elements, and records times at which the offsets happen. The computing unit is electrically connected to the detecting circuit, and computes a flow rate of the fluid according to the times at which the offsets happen of the resonant frequencies and locations that are of the resonator elements and that correspond to the flow path.

An embodiment of the present invention provides a flow rate measurement method, including: continuously transmitting, within a measurement time, microwaves to a flow path of a fluid by using a transmitting circuit, where the transmitting circuit includes a plurality of resonator elements, and each of microwaves separately generated by the resonator elements has at least one resonant frequency; detecting offsets of the corresponding resonant frequencies that are caused when the fluid flows through the resonator elements; computing a flow rate of the fluid according to the times at which the offsets happen of the resonant frequencies and locations that are of the resonator elements and that corresponds to the flow path.

According to the microwave flowmeter and the flow rate measurement method that are provided in the embodiments of the present invention, flow rate measurement in a non-intrusive manner can be implemented. In addition, a dielectric coefficient of a fluid can be deduced according to a measured resonant frequency, so as to identify the dielectric property of the fluid.

DETAILED DESCRIPTION

Figure 1:
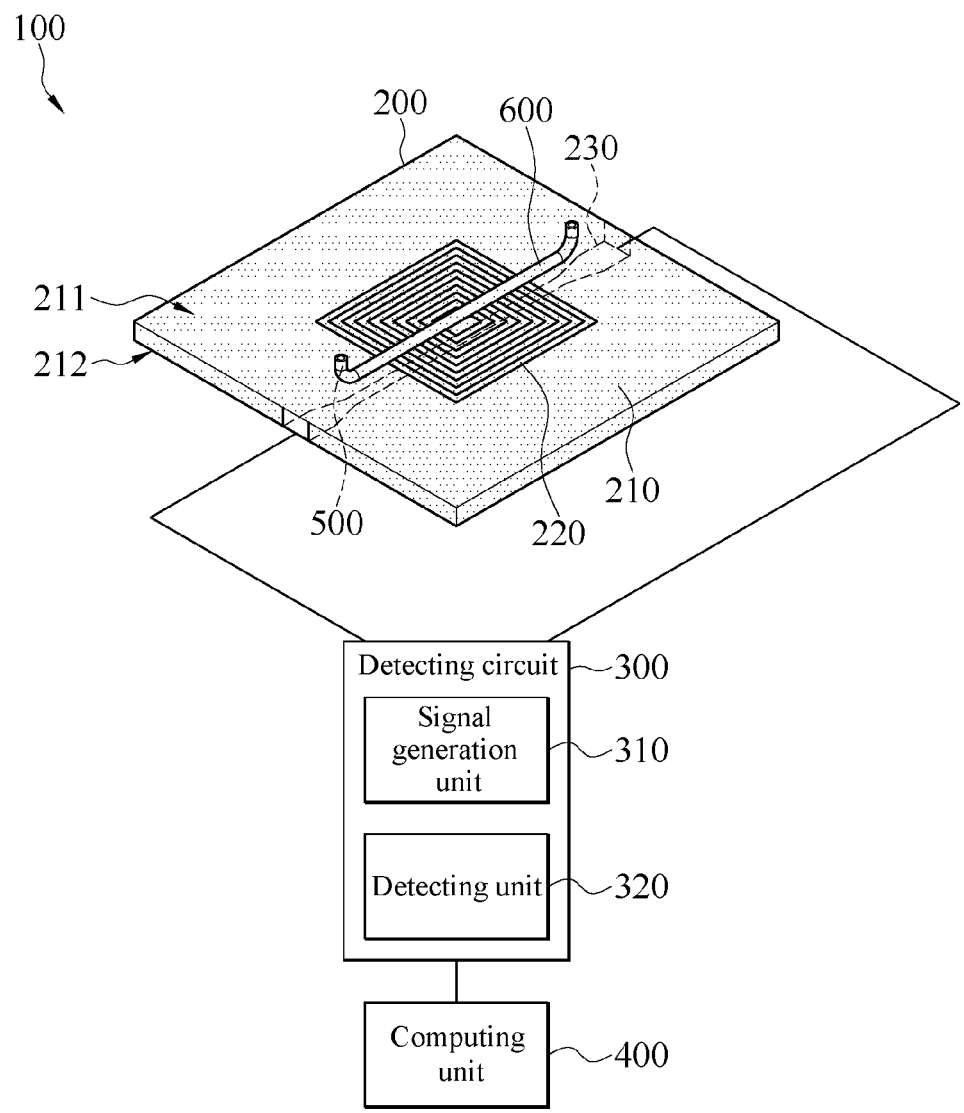
FIG. 1 is a schematic architectural diagram of a microwave flowmeter according to an embodiment of the present invention.

Referring to FIG. 1, FIG. 1 is a schematic architectural diagram of a microwave flowmeter 100 according to an embodiment of the present invention. The microwave flowmeter 100 may be configured to detect a flow rate of a fluid, and includes a transmitting circuit 200, a detecting circuit 300, and a computing unit 400. The detecting circuit 300 is electrically connected to a transmitting circuit 200, to feed a high frequency electrical signal to the transmitting circuit 200, so that the transmitting circuit 200 generates a microwave, and detects a resonant frequency change (that is, a frequency offset) of the microwave. The computing unit 400 is electrically connected to the detecting circuit 300, to calculate the flow rate of the fluid according to the frequency offset and its corresponding times of the microwave. This is described in detail in the following.

Figure 2:
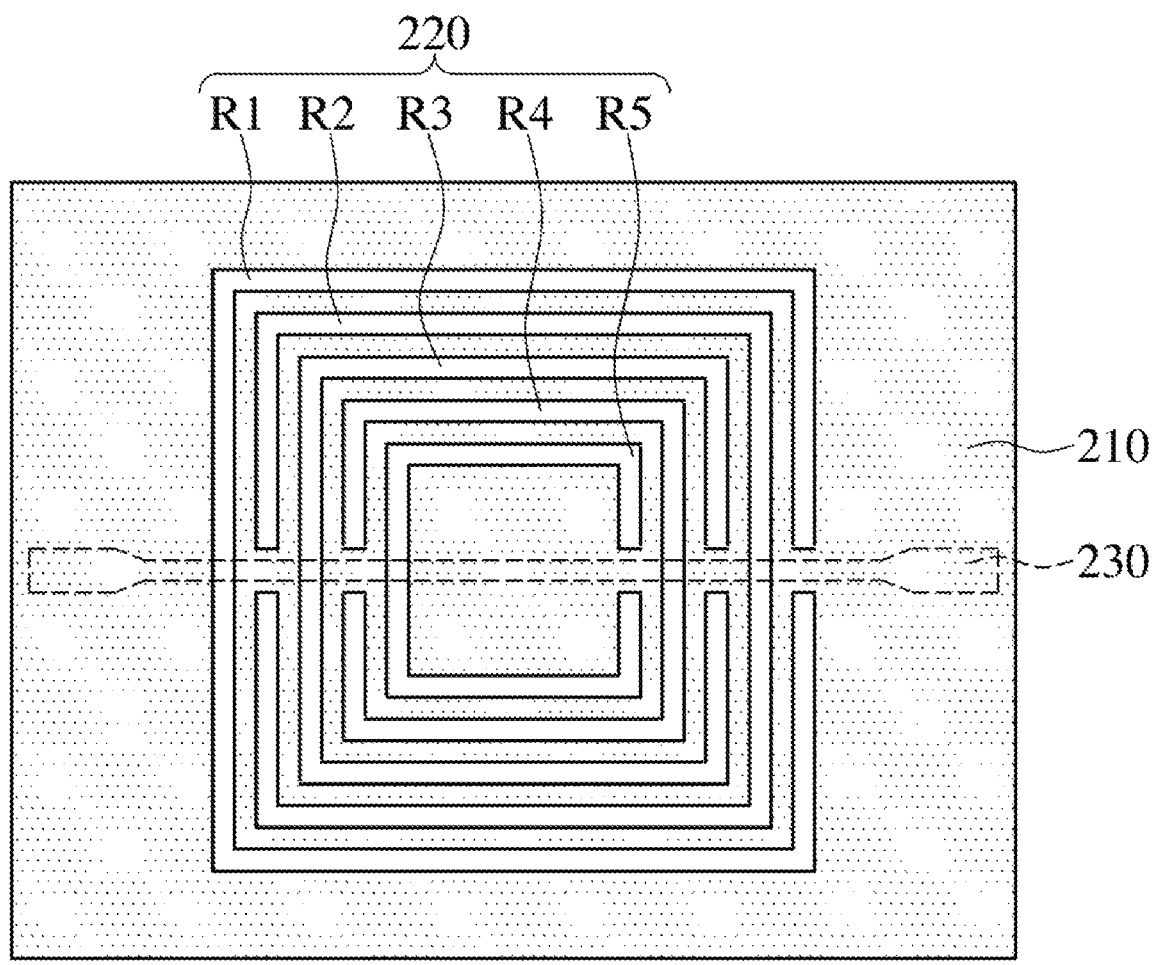
FIG. 2 is a top view of a transmitting circuit according to an embodiment of the present invention.

Referring to FIG. 2, FIG. 2 is a top view of a transmitting circuit 200 according to an embodiment of the present invention. The transmitting circuit 200 generates a microwave, and includes a substrate 210, a plurality of resonator elements 220, and a transmission line 230. A substrate 210 is a substrate made of a dielectric material such as a printed circuit board (PCB), FR4 laminated board (laminated sheet composed of woven fiberglass cloth with an epoxy resin), or glass. The substrate 210 has a first surface 211 and a second surface 212 that are opposite to each other. During measurement, the first surface 211 faces towards a flow path of a fluid 500. In this embodiment, as shown in FIG. 1, the first surface 211 of the substrate 210 is provided with a flow channel 600, which allows a small amount of fluid 500 to flow through, and is the flow path of the fluid 500. The fluid 500 is liquid. To clearly show appearances of the resonator element 220 and the transmission line 230 in FIG. 2, the flow channel 600 is not drawn in FIG. 2.

In an embodiment, the flow channel 600 is made of a dielectric material, for example, polymethylmethacrylate (PMMA) or glass. However, in some embodiments, the microwave flowmeter 100 does not have the flow channel 600, and during measurement, the microwave flowmeter 100 is adhered to, contacts, or close to the flow path of the fluid 500 (for example, a pipeline of the fluid). The flow channel 600 may be a to-be-measured pipe, or may be implemented by using a micro-fluidic channel, to detect fluidity of traces of specimen.

As shown in FIG. 1 and FIG. 2, the resonator element 220 is disposed on the first surface 211, and the transmission line 230 is disposed on the second surface 212 of the substrate 210, and is disposed corresponding to a location of the resonator element 220. Therefore, the resonator element 220 is a complementary split ring resonator (CSRR), referred to as "ring" in the following, and lengths of resonance currents of the resonator elements 212 are not equal. Therefore, the resonator element 220 is of a half-wavelength structure, and a resonant frequency may be adjusted by designing the length of a resonance current. In this embodiment, there are five rings, numbered R1 to R5 from outside to inside. A projection that is of the transmission line 230 and that is on the first surface 211 passes through openings of the rings R1 to R5. Herein, the rings R1 to R5 are formed by means of slotting on a metal surface, and a slotting manner may be etching, carving, or the like, and a peripheral of the ring R1 is a ground plane. The rings are disposed adjacent to each other, and therefore an equivalent resonance circuit (LC tank) is formed. When the fluid 500 flows (liquid under test, LUT) through the resonator elements, an equivalent capacitance change due to the flowing LUT is caused. As a result, a resonant frequency offset is caused. Therefore, according to a flowchart of a flow rate measurement method according to an embodiment of the present invention shown in FIG. 8, a location that the fluid 500 flows through may be determined by detecting the resonant frequency offset, and the flow rate may be determined with reference to a time.

Figure 8:
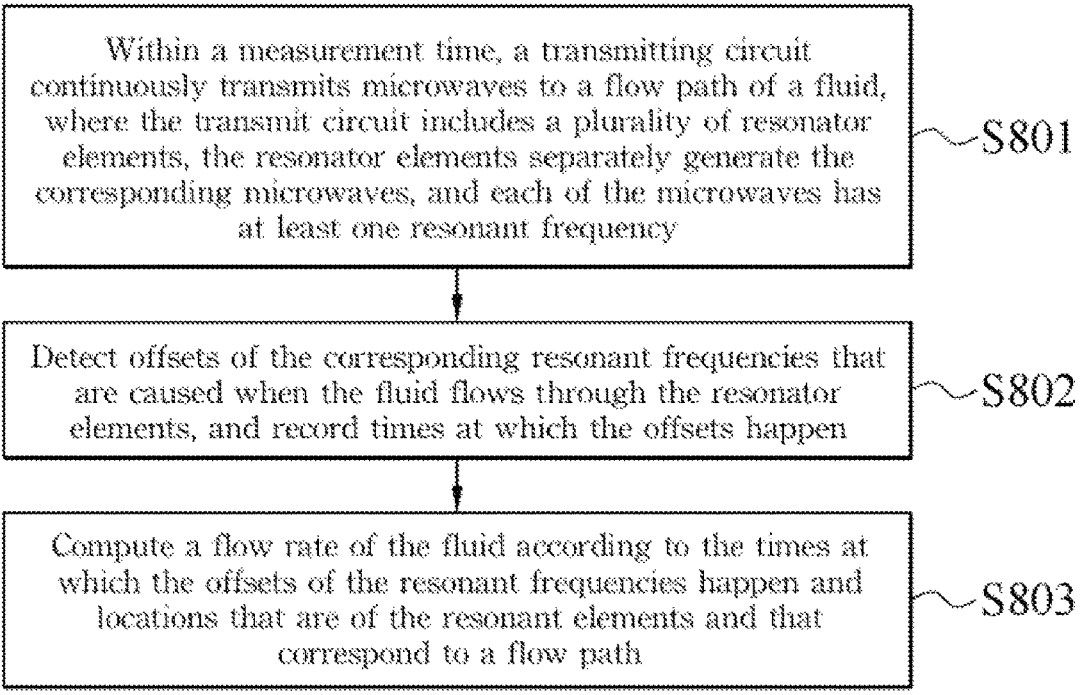
FIG. 8 is a flowchart of a flow rate measurement method according to an embodiment of the present invention.

Referring to both FIG. 2 and FIG. 8, the transmission line 230 may be a microstrip line, and has two ends tapering from a relatively large width to a relatively small width, so as to keep the relatively small width within a coverage that stretches across the resonator element 220. In step S801, the two ends of the transmission line 230 continuously receives electric feedings from the detecting circuit 300 within a measurement time, so that the resonator elements 212 generate microwaves. That is, the transmitting circuit 200 continuously transmits the microwaves to the flow path of the fluid 500, and each of the generated microwaves has at least one resonant frequency and induces strong electromagnetic fields which is locally maximal at that frequency. In some embodiments, the transmission line 230 may be a waveguide or another feeder (such as a strip line, a coplanar waveguide (CPW), a coplanar waveguide with a ground plane (CPWG), or a slot line). That is, the transmission line 230 may be a conductive strip line or a non-conductive line (for example, an etched portion on a metal surface).

The detecting circuit 300 includes a signal generation unit 310 and a detecting unit 320. The signal generation unit 310 is electrically connected to the two ends of the transmission line 230, to generate a high frequency signal, and provide the high frequency signal to the transmitting circuit 200, so that the transmitting circuit 200 can generate microwaves. In step S802, the detecting unit 320 detects a microwave signal, and can detect a resonant frequency change (an offset), and record times when the offsets happen at the same time. For example, the detecting unit 320 may be a vector network analyzer (VNA), a spectrum analyzer, or another detecting circuit such as an envelope detector circuit.

Figure 3:
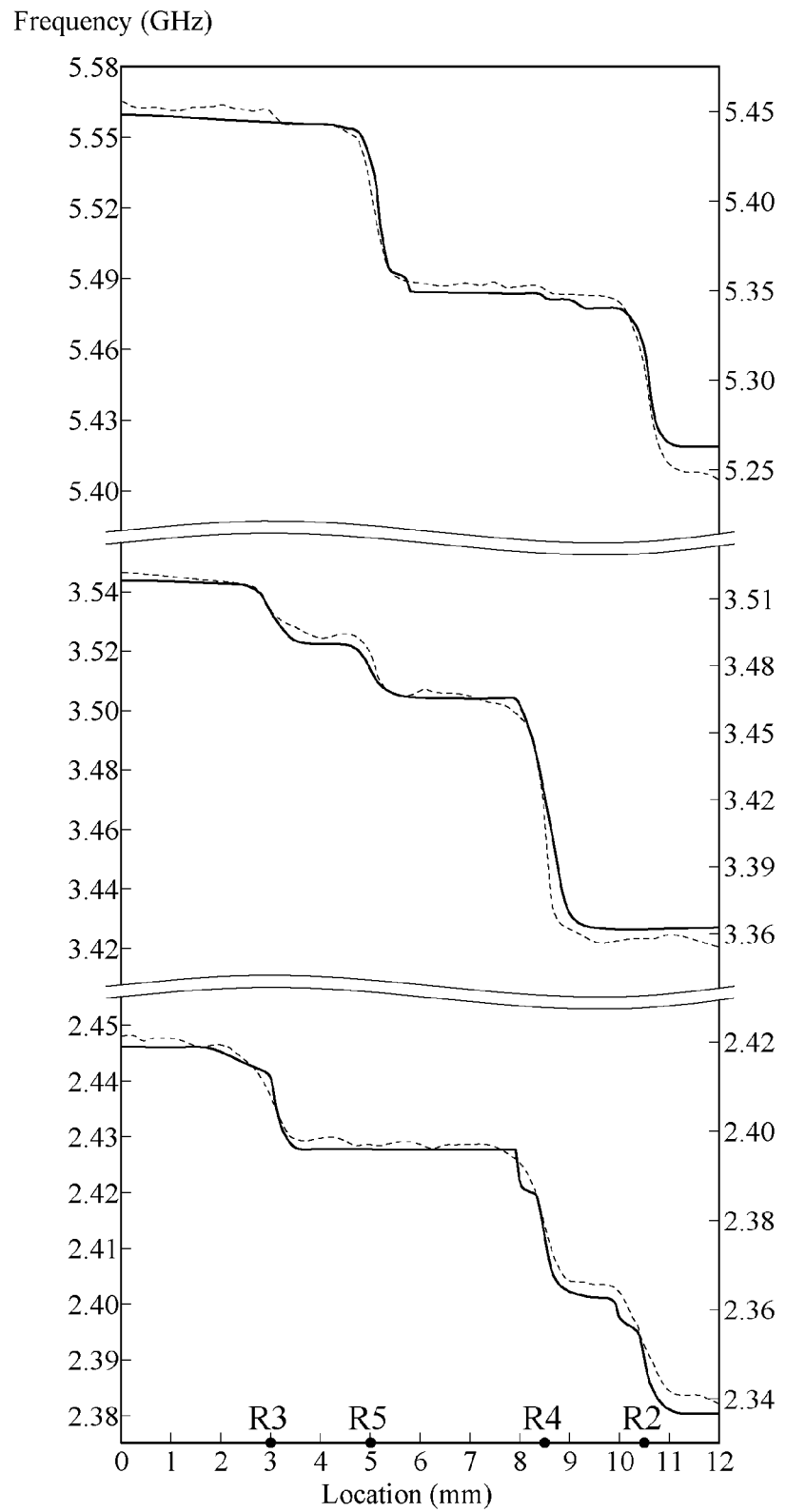
FIG. 3 is a schematic diagram of a resonant frequency according to an embodiment of the present invention.

Referring to FIG. 3, FIG. 3 is a schematic diagram of a resonant frequency according to an embodiment of the present invention. The vertical coordinate is a frequency, the horizontal coordinate is a location of the flow channel, and locations opposite to the openings of the rings R2 to R5 are correspondingly marked. Solid lines are measurement results, and dashed lines are simulation results. Herein, the substrate 210 is made of a laminated board, and the fluid is water. As shown in FIG. 3, there are three resonance bands from the top down, respectively being resonance modes of the rings R2, R4, and R5. Herein, there is a multiple relationship between the lengths of the resonance currents of the rings R2 and R5, and the lengths of the ring R2 is three times of the lengths of the ring R5. That is, a third resonance mode of the ring R2 and a first resonance mode of the ring R5 have a same wavelength. Therefore, both resonant frequencies of the ring R2 and the ring R5 are located in a resonance band from 5.4 GHz to 5.58 GHz. When the fluid 500 flows through the ring R2, not only an offset of the resonant frequency of the ring R2 is caused, but also an offset of the resonant frequency of the ring R5 is caused. Vice versa, when the fluid 500 flows through the ring R5, not only an offset of the resonant frequency of the ring R5 is caused, but also an offset of the resonant frequency of the ring R2 is caused due to the adjacent coupling effect.

In addition, due to a coupling effect, resonant frequencies of neighboring rings may be seen in a same resonance band. For example, in a resonance band from 3.42 GHz to 3.54 GHz, although the fluid 500 flows through the ring R4, in addition to an offset of the resonant frequency of the ring R4, it may still be seen that offsets of the rings R3 and R5 adjacent to the ring R4 are also caused. In a resonance band from 2.38 GHz to 2.45 GHz, although the fluid 500 flows through the ring R3, in addition to an offset of the resonant frequency of the ring R3, it may still be seen that offsets of the resonant frequencies of the rings R2 and R4 adjacent to the ring R3 are caused due to a coupling design of the rings. That is, the resonator elements 220 corresponding to resonant frequencies in a same resonance band are adjacent to each other.

No matter by designing a length of a resonance current or due to a coupling effect of neighboring signals, not only the resonant frequencies of the resonator element 220 are distributed in a plurality of resonance bands, but also there are resonant frequencies of at least two resonator elements 220 in the resonance bands. Therefore, a measurement result may be confirmed for multiple times, to prevent erroneous determining and increase accuracy of location measurement.

In step S803, the computing unit 400 receives the foregoing detection result of the detecting unit 320, and computes a flow rate of the fluid 500 according to the time at which the offsets of the resonant frequencies happen and locations that are of the resonator elements 220 and that correspond to the flow path. That is, the computing unit 400 may determine, according to values of the resonant frequencies before the offsets are caused, the resonant frequency of which of the resonator elements 220 has an offset, to obtain a location corresponding to the flow path, and record a current time at the same time. After times when the fluid 500 flows through different locations are detected, a location difference may be divided by a time difference, to obtain the flow rate of the fluid 500. Herein, the computing unit 400 may be an operation unit such as a microprocessor, a microcontroller, or an embedded processor.

In some embodiments, the microwave flowmeter 100 has a storage unit, to store the detected flow rate. In some embodiments, the microwave flowmeter 100 has an output unit, such as a display, to display the detected flow rate; or such as a data transmission interface, to transmit the detected flow rate to another apparatus (such as a mobile phone or a server).

Figure 4:
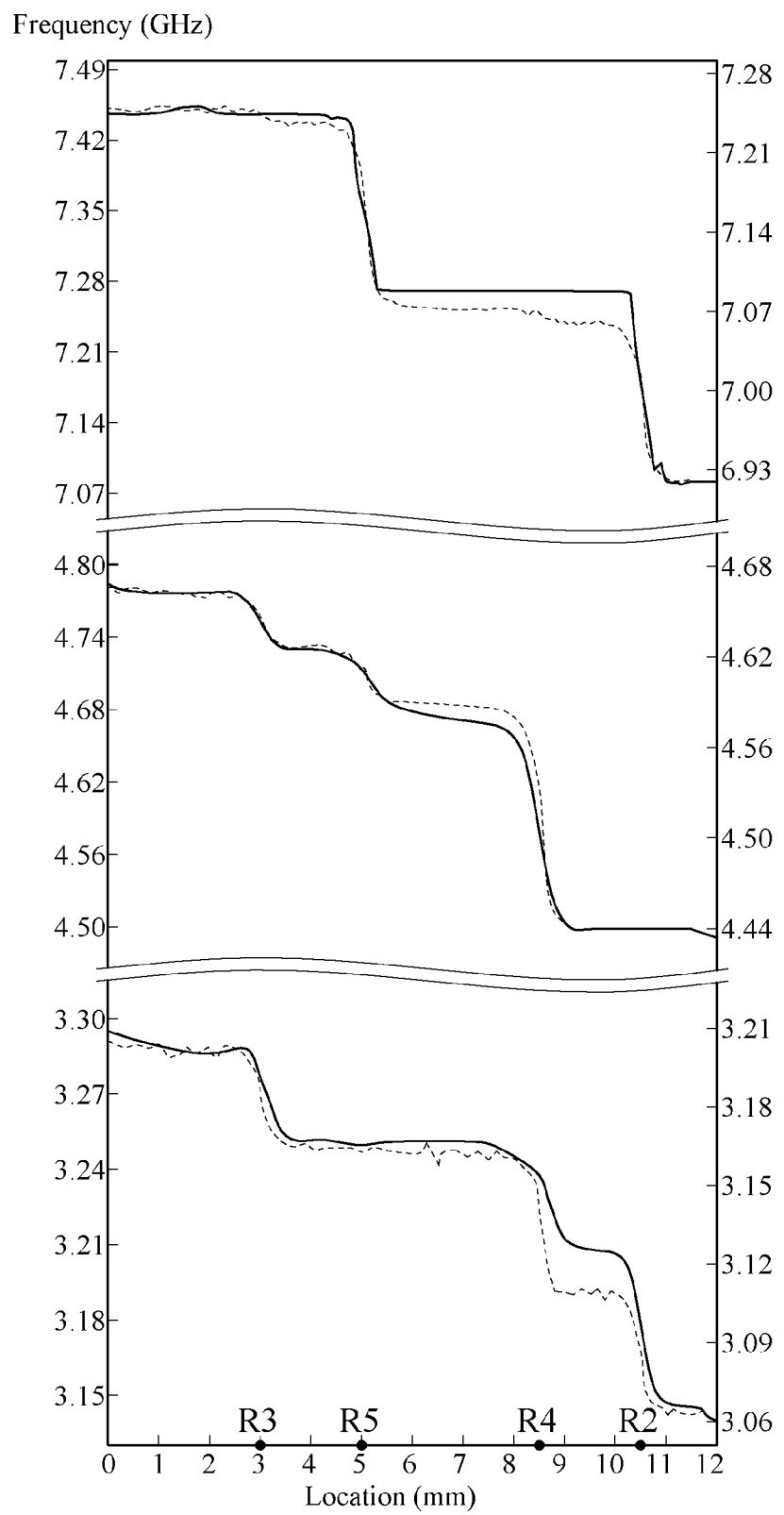
FIG. 4 is a schematic diagram of a resonant frequency according to another embodiment of the present invention.

FIG. 4 is a schematic diagram of a resonant frequency according to another embodiment of the present invention. The vertical coordinate is a frequency, the horizontal coordinate is a location of the flow channel 600, and locations opposite to the openings of the rings R2 to R5 are correspondingly marked. Solid lines are measurement results, and dashed lines are simulation results. Herein, the substrate 210 is made of glass, and the fluid 500 is water. It can be seen that, as shown in FIG. 3, there are three resonance bands from the top down, respectively being resonance modes of the rings R2, R4, and R3. A difference between the FIG. 4 and FIG. 3 lies only in that values of resonant frequencies are different. The difference between the resonant frequencies may be used to detect a dielectric constant of a to-be-measured fluid 500, thereby detect a related property of the to-be-measured fluid 500.

Figure 5:
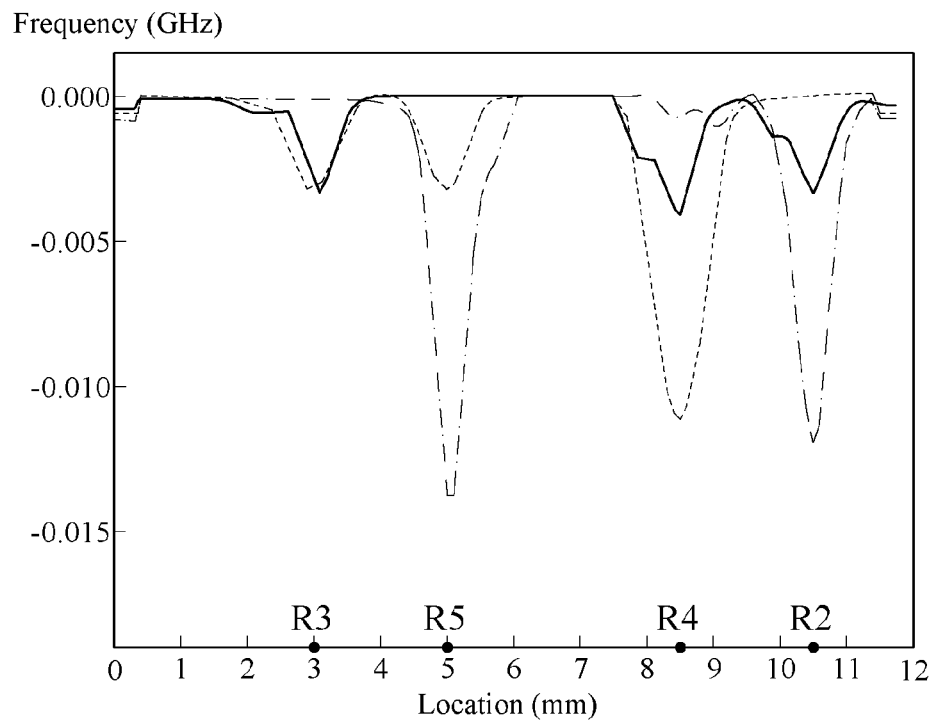
FIG. 5 is a schematic diagram of a derivative of the resonant frequency in FIG. 3.
Figure 6:
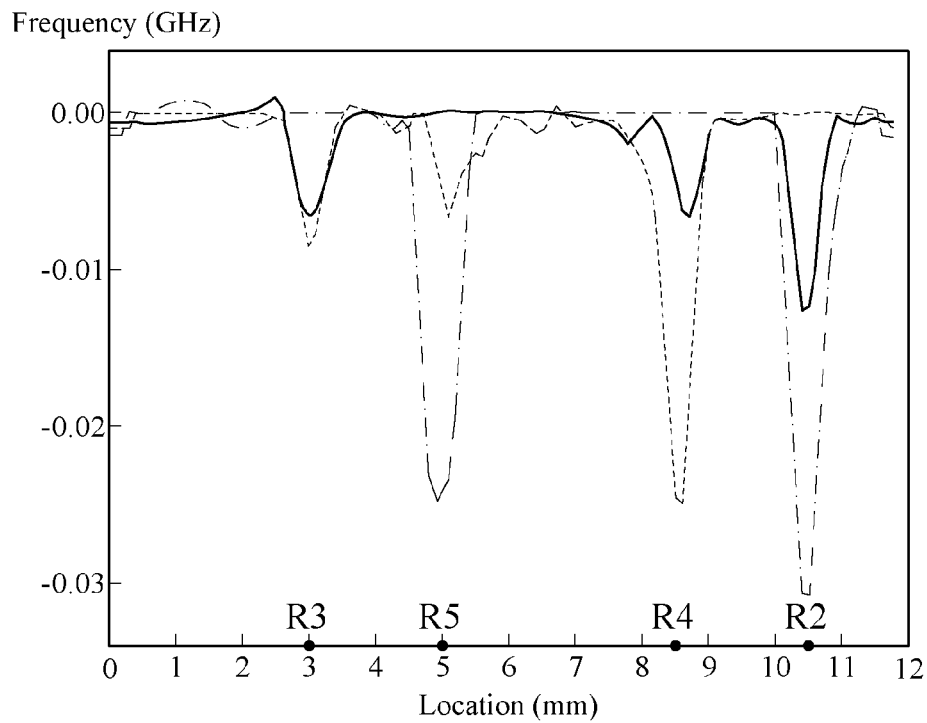
FIG. 6 is a schematic diagram of a derivative of the resonant frequency in FIG. 4.

FIG. 5 and FIG. 6 are respectively schematic diagrams of changes of the resonant frequencies in FIG. 3 and FIG. 4, and show differentials of the resonant frequencies in FIG. 3 and FIG. 4, to present the frequency changes. With reference to a sequence of the resonance bands from the top down, the point chain line presents the frequency change of the resonance mode of the ring R2. The dashed line presents the frequency change of the resonance mode of the ring R4. The solid line presents the frequency change of the resonance mode of the ring R3. It can be clearly seen that, in various resonant frequencies and modes, a location that the fluid 500 flows through can be accurately determined. In an embodiment, the computing unit 400 may determine, according to extremums after the resonant frequencies are differentiated, the resonant frequency of which of the resonator elements 220 has an offset, to obtain a location corresponding to the flow path, and record a current time at the same time.

When the fluid 500 is homogeneous, the detected location that the fluid 500 flows through is a location that a front end of the fluid 500 flows through. When the fluid 500 is non-homogeneous, that is, no impurity substance is mixed in the fluid 500, for example, oil drops are mixed in water or bubbles are mixed in the fluid 500, and herein the impurity substance may be used as a trace marker, a detected frequency change not only can be used to detect the location that the front end of the fluid 500 flows through, but also can reflect a location of the impurity substance, to continuously determine the flow rate of the fluid 500.

In an embodiment, referring to Table 1, Table 1 provides a description by using four complementary split ring resonators. From outside to inside, a resonant frequency of the first ring is referred to as a "first mode", a resonant frequency of the second ring is referred to as a "second mode", a resonant frequency of the third ring is referred to as a "third mode", and a resonant frequency of the fourth ring is referred to as a "fourth mode". If the resonant frequencies of the rings are separately measured when the rings are separated from each other, measurement values "before coupling" are obtained. If the resonant frequencies of the rings are measured when the rings are arranged together, measurement values "after coupling" are obtained. It can be seen that, the two middle rings have relatively small frequency offsets. Therefore, according to the embodiment of the five rings, the outmost of the complementary split ring resonators (i.e., the ring R1) is a redundancy loop, and its role is not to detect a frequency offset but to use a capacitance effect between the ring R1 and a neighboring ring R2 to reduce resonant frequency offsets caused by adjacent arrangement of the rings R2 to R5, thereby increasing detection sensitivity.

TABLE 1

| Frequency | First mode | Second mode | Third mode | Fourth mode |
| --- | --- | --- | --- | --- |
| Before coupling | 1.491 GHz | 1.903 GHz | 2.726 GHz | 4.078 GHz |
| After coupling | 1.117 GHz | 1.918 GHz | 2.773 GHz | 4.786 GHz |
| Frequency offset | 25% | 0.8% | 1.7% | 14.8% |

Figure 7:
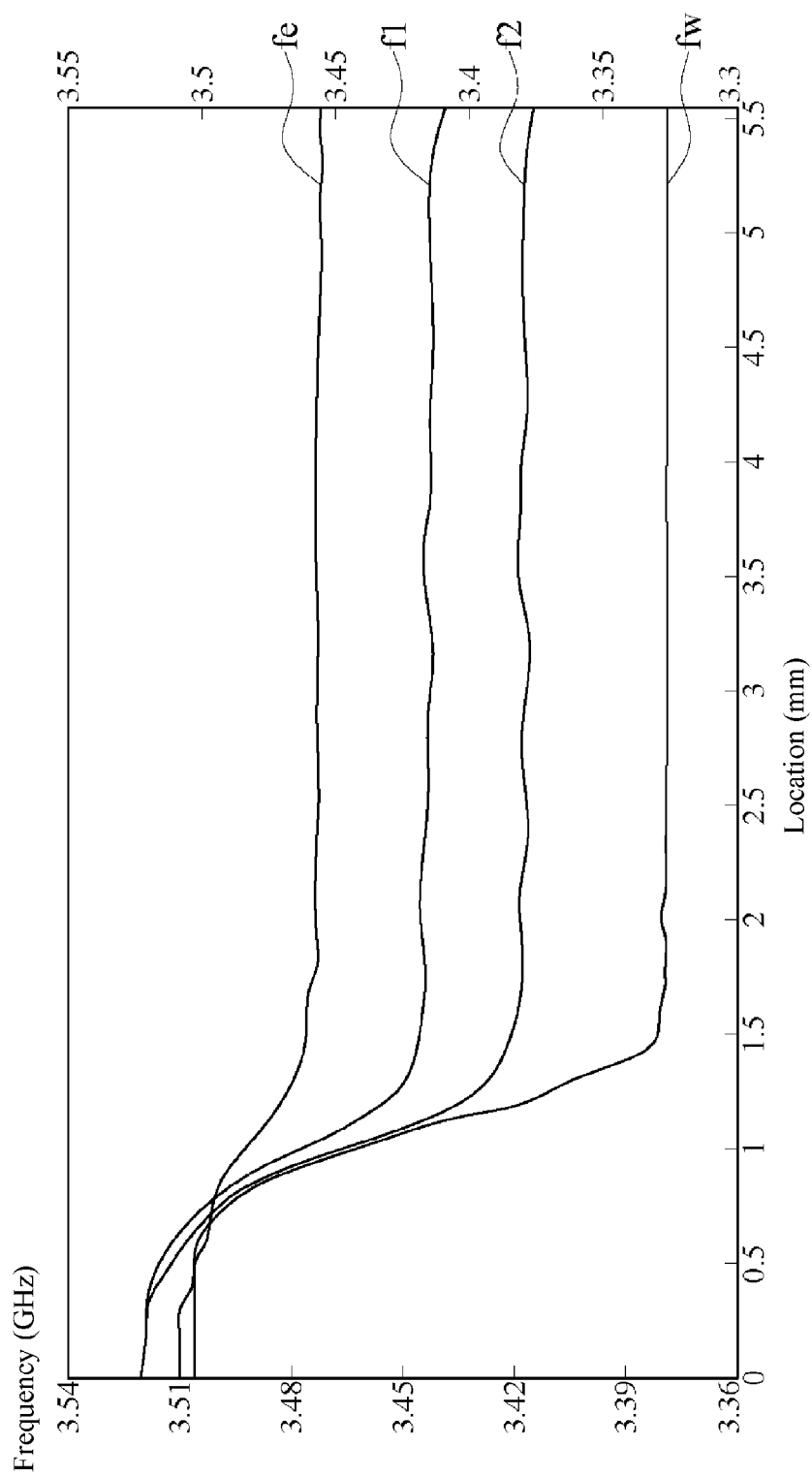
FIG. 7 is a schematic diagram of resonant frequencies of different fluids according to an embodiment of the present invention.
Figure 9:
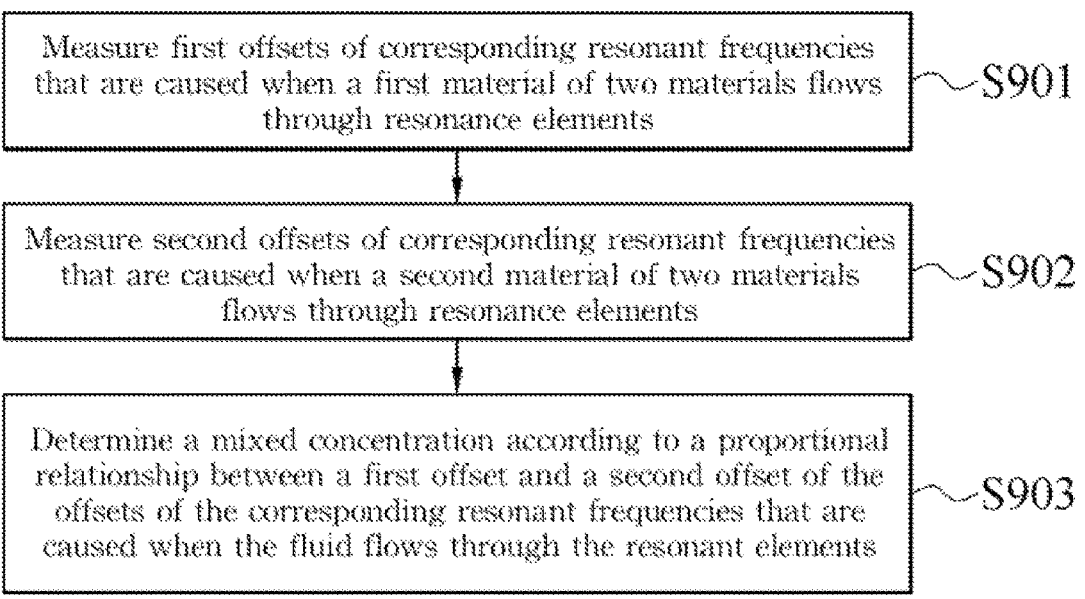
FIG. 9 is a flowchart of measuring a fluid mixed concentration according to an embodiment of the present invention.

FIG. 7 is a schematic diagram of resonant frequencies of different fluids 500 according to an embodiment of the present invention. Herein, a measurement result of only one complementary split ring resonator is presented. The flowchart of measuring a fluid 500 mixed concentration according to an embodiment of the present invention shown in FIG. 9 should be used as reference. First, first offsets of the corresponding resonant frequencies that are caused when a first material of the two materials flows through the resonator elements 220 are measured (step S901). For example, when the fluid 500 is water, a resonant frequency fw decreases from 3.51 GHz to approximately 3.39 GHz. Next, second offsets of the corresponding resonant frequencies caused when a second material of the two materials flows through the resonator elements 220 are measured (step S902). For example, when the fluid 500 is anhydrous alcohol, a resonant frequency fe decreases from 3.51 GHz to approximately 3.48 GHz. When the fluid 500 is a mixture of water and anhydrous alcohol, resonant frequencies f1 and f2 are located between the resonant frequency fw and the resonant frequency fe. A dielectric coefficient of the fluid 500 is approximately proportional to a reciprocal of the square of a detected resonant frequency. The computing unit 400 may determine the dielectric coefficient of the fluid 500 according to a resonant frequency offset amplitude. Therefore, when the fluid 500 is a mixture of two materials, the computing unit 400 may determine a mixed concentration of the fluid 500 according to the resonant frequency offset amplitude (or a resonant frequency after the offset is caused), that is, determine the mixed concentration according to a proportional relationship between the first offset and the second offset of the corresponding resonant frequency offsets that are caused when the fluid 500 flows through the resonator elements 220 (step S903). A higher proportion of a material in the fluid 500 indicates that the resonant frequency obtained after an offset is caused is closer to a resonant frequency of the material that is obtained after an offset is caused. For example, a higher proportion of anhydrous alcohol indicates that a resonant frequency of the fluid 500 obtained after an offset is caused is closer to the resonant frequency fe (such as the resonant frequency f1) of anhydrous alcohol. Vise versa, a higher proportion of water indicates that a resonant frequency of the fluid 500 that is obtained after an offset is caused is closer to the resonant frequency fw (such as the resonant frequency f2), and therefore this may be used to detect a concentration of the fluid 500.

In summary, according to the microwave flowmeter 100 and the flow rate measurement method that are provided in the embodiments of the present invention, flow rate measurement in a non-intrusion manner can be implemented. In addition, a dielectric coefficient of the fluid 500 can be deduced according to a measured resonant frequency, so as to identify content of the fluid 500.

What is claimed is:

1. A microwave flowmeter, configured to detect a flow rate of a fluid, wherein the microwave flowmeter comprises:
   a transmitting circuit, comprising:
   a substrate, having a first surface and a second surface that are opposite to each other, wherein the first surface faces towards a flow path of the fluid;
   a plurality of resonator elements, disposed on the first surface of the substrate, wherein lengths of resonance currents of the resonator elements are not equal; and
   a transmission line, disposed on the second surface of the substrate, and disposed corresponding to locations of the resonator elements, wherein two ends of the transmission line receive electric feedings, so that the resonator elements separately generate corresponding microwaves and each of the microwaves has at least one resonant frequency;
   a detecting circuit, detecting offsets of the corresponding resonant frequencies that are caused when the fluid flows through the resonator elements, and recording times at which the offsets happen; and
   a computing unit, electrically connected to the detecting circuit, and computing a flow rate of the fluid according to the times at which the offsets happen of the resonant frequencies and locations that are of the resonator elements and that correspond to the flow path.

2. The microwave flowmeter according to claim 1, wherein the computing unit determines, according to values of the resonant frequencies before the offsets are caused, the resonant frequency of which of the resonator elements has an offset, to obtain a location corresponding to the flow path.

3. The microwave flowmeter according to claim 1, wherein the computing unit determines a dielectric coefficient of the fluid according to offset amplitudes of the resonant frequencies.

4. The microwave flowmeter according to claim 1, wherein when the fluid is a mixture of two materials, the computing unit determines a mixed concentration of the fluid according to offset amplitudes of the resonant frequencies.

5. The microwave flowmeter according to claim 1, wherein the resonant frequencies of the resonator elements are distributed in a plurality of resonance bands, and each of the resonance bands has the resonant frequencies of at least two of the resonator elements.

6. The microwave flowmeter according to claim 5, wherein the resonator elements corresponding to the resonant frequencies in a same resonance band are adjacent to each other.

7. The microwave flowmeter according to claim 1, wherein each of the resonator elements is a complementary split ring resonator, and the outmost of the complementary split ring resonators is a redundancy loop.

8. A flow rate measurement method, comprising:
   continuously transmitting, within a measurement time, microwaves to a flow path of a fluid by using a transmitting circuit, wherein the transmitting circuit comprises a plurality of resonator elements, the resonator elements separately generate the corresponding microwaves, and each of the microwaves has at least one resonant frequency;
   detecting offsets of the corresponding resonant frequencies that are caused when the fluid flows through the resonator elements, and recording times at which the offsets happen; and
   computing a flow rate of the fluid according to the times at which the offsets happen of the resonant frequencies and locations that are of the resonator elements and that correspond to the flow path.

9. The flow rate measurement method according to claim 8, wherein before the computing a flow rate of the fluid, the method further comprises: determining, according to values of the resonant frequencies before the offsets are caused, the resonant frequency of which of the resonator elements has an offset, to obtain a location corresponding to the flow path.

10. The flow rate measurement method according to claim 9, further comprising: determining a dielectric coefficient of the fluid according to offset amplitudes of the resonant frequencies.

11. The flow rate measurement method according to claim 9, further comprising: determining a mixed concentration of the fluid according to offset amplitudes of the resonant frequencies, wherein the fluid is a mixture of two materials.

12. The flow rate measurement method according to claim 11, further comprising:
   measuring first offsets of the corresponding resonant frequencies that are caused when a first material of the two materials flows through the resonator elements; and
   measuring second offsets of the corresponding resonant frequencies that are caused when a second material of the two materials flows through the resonator elements, wherein
   the determining a mixed concentration of the fluid according to the offset amplitudes of the resonant frequencies is determining the mixed concentration according to a proportional relationship between the first offset and the second offset of the offsets of the corresponding resonant frequencies that are caused when the fluid flows through these resonator elements.

* * * * *